(12) United States Patent
Brezinski

(10) Patent No.: US 6,315,045 B1
(45) Date of Patent: Nov. 13, 2001

(54) METHODS AND ACIDIZING COMPOSITIONS FOR REDUCING METAL SURFACE CORROSION AND SULFIDE PRECIPITATION

(75) Inventor: Michael M. Brezinski, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/519,933

(22) Filed: Mar. 7, 2000

(51) Int. Cl.$^7$ ..................................... E21B 43/27
(52) U.S. Cl. .................... 166/300; 166/307; 166/902; 507/244; 507/266; 507/267; 507/277; 507/934; 507/939
(58) Field of Search ..................... 166/271, 300, 166/307, 310, 902; 507/244, 248, 252, 266, 267, 277, 933, 934, 939

(56) References Cited

U.S. PATENT DOCUMENTS

| | | | |
|---|---|---|---|
| 3,854,959 | 12/1974 | Costain et al. . | |
| 3,876,371 | 4/1975 | Costain et al. . | |
| 3,913,678 | * 10/1975 | Bount et al. | 166/310 |
| 4,147,212 | * 4/1979 | Tisdale | 166/902 X |
| 4,552,668 | * 11/1985 | Brown et al. | 166/300 X |
| 4,633,949 | 1/1987 | Crowe | 166/279 |
| 4,888,121 | 12/1989 | Dill et al. . | |
| 4,949,790 | * 8/1990 | Dill et al. | 166/307 |
| 5,071,574 | * 12/1991 | Pou | 507/939 X |
| 5,126,059 | * 6/1992 | Williamson | 166/307 X |
| 5,152,916 | * 10/1992 | Hoffmann et al. | 507/939 X |
| 5,264,141 | 11/1993 | Brezinski et al. . | |
| 5,622,919 | * 4/1997 | Brezinski et al. | 166/300 X |

FOREIGN PATENT DOCUMENTS 1449826 9/1976 (GB) .

* cited by examiner

*Primary Examiner*—George Suchfield
(74) *Attorney, Agent, or Firm*—Robert A. Kent; Clifford C. Dougherty, III

(57) ABSTRACT

Methods and acidizing compositions for reducing the corrosion of the metal surfaces of tubular goods and the like and reducing the precipitation of metal sulfide from the acidizing compositions are provided. The methods basically comprise the steps of combining an aldol-amine adduct with an aqueous acid solution to preferentially react with sulfide ions subsequently dissolved by the aqueous acid solution and thereby prevent subsequently dissolved metal ions from reacting therewith and precipitating, and then introducing the aqueous acid solution containing the aldol-amine adduct into a well or other location to be acidized.

13 Claims, No Drawings

METHODS AND ACIDIZING COMPOSITIONS FOR REDUCING METAL SURFACE CORROSION AND SULFIDE PRECIPITATION

BACKGROUND OF THE INVENTION

1. Field of the Invention.

The present invention relates to methods and aqueous acid compositions for reducing metal surface corrosion and the precipitation of metal sulfides from the aqueous acid compositions when acidizing a sour well or other similar location.

2. Description of the Prior Art.

Aqueous acid solutions are commonly used to treat oil or gas wells. For example, subterranean well formations are often contacted with aqueous acid solutions to increase the permeabilities of the formations whereby the production of oil and/or gas therefrom is increased. Aqueous acid solutions are also utilized to etch flow channels in the faces of fractures formed in the formations and to clean out perforations and tubular goods in wells.

When the well being treated is sour, i.e., the fluids produced contain a significant quantity of sulfide compounds, and particularly hydrogen sulfide, problems are often encountered as a result of the precipitation of metal sulfide such as iron sulfide from the aqueous acid solution. That is, dissolved sulfide ions and dissolved ferrous ions from ferrous sulfide scale and/or metal ions from the subterranean formation being treated react to form metal sulfides in the acid solution. The metal sulfides precipitate from the acid solution when the pH reaches a level greater than about 1.9. The pH of spent aqueous acid solutions used to treat subterranean formations is greater than 1.9, and therefore, metal sulfides dissolved in an unspent acid solution precipitate at some point before becoming spent. The metal sulfide precipitates can plug the treated formation and cause serious damage to the well.

Aqueous acid solutions are also used to remove scale from tubular apparatus such as heat exchangers, boilers and the like. If the scale contains metal and sulfide compounds, metal sulfide precipitates can form which interfere with the cleaning process.

While a variety of methods and compositions have been developed heretofore for preventing the precipitation of metal sulfides from aqueous acid treating solutions, there is a continuing need for improved acidizing methods and compositions which are relatively inexpensive and produce little or no metal sulfide precipitates.

SUMMARY OF THE INVENTION

The present invention provides methods and aqueous acid compositions for treating subterranean formations in sour wells, tubular apparatus and the like wherein corrosion of metal surfaces contacted by the aqueous acid compositions and metal sulfide precipitation from the aqueous acid compositions are reduced or prevented.

The methods of the present invention for acidizing a sour well containing metal compounds and sulfide compounds are basically comprised of combining an aldol-amine adduct with an aqueous acid solution to preferentially react with sulfide ions subsequently dissolved by the aqueous acid solution and thereby prevent subsequently dissolved metal ions from reacting with the sulfide ions and precipitating. Thereafter, the aqueous acid solution containing the aldol-amine adduct is introduced into the well.

The aqueous acid compositions of the invention are basically comprised of water, an acid selected from the group consisting of inorganic acids, organic acids and mixtures thereof and an aldol-amine adduct which is soluble and stable in the water and acid. The aldol-amine adduct preferentially reacts with sulfide ions when they are dissolved in the acid compositions thereby preventing the dissolved sulfide ions from reacting with dissolved metal ions and precipitating.

It is, therefore, a general object of the present invention to provide improved methods and compositions for reducing metal corrosion and metal sulfide precipitation when acidizing sour wells and the like.

Other and further objects, features and advantages of the present invention will be readily apparent to those skilled in the art upon a reading of the description of preferred embodiments which follows.

DESCRIPTION OF PREFERRED EMBODIMENTS

The present invention provides methods and aqueous acid compositions for reducing metal surface corrosion and metal sulfide precipitation when acidizing a well or apparatus containing metal compounds and sulfide compounds.

The term "sour well" is used herein to mean oil, gas and other wells containing metal compounds and sulfide compounds, particularly hydrogen sulfide. When such wells are treated with an aqueous acid solution to stimulate the production of hydrocarbons therefrom, the aqueous acid solution dissolves sulfide ions and metal ions such as iron, zinc and lead. When the pH of the aqueous acid solution reaches a level of about 1.9 and higher, the metal ions and sulfide ions react and metal sulfides precipitate from the solution. Metal sulfide precipitate can plug the acidized formation or otherwise cause serious damage to wells and associated production equipment.

In accordance with the methods of the present invention, an aldol-amine adduct is combined with an aqueous acid solution in an amount whereby when the acid solution contains dissolved sulfide ions and dissolved metal ions, the sulfide ions are prevented from reacting with the metal ions. That is, the aldol-amine adduct preferentially reacts with sulfide ions in the aqueous acid solution and thereby prevents the sulfide ions from reacting with metal ions therein.

Aldol ($CH_3CH(OH)CH_2CHO$) has heretofore been utilized as a hydrogen sulfide scavenger which prevents metal sulfide precipitation from aqueous acid solutions. However, when aldol or an aqueous solution of aldol is stored, it quickly separates into two layers with all of the aldol concentrated in the bottom layer. The bottom layer containing the aldol is not redispersible in the top layer or in water or acid. Also, the aldol in the bottom layer has very little activity as a sulfide scavenger. Thus, the use of aldol as a hydrogen sulfide scavenger in aqueous acid solutions can result in less than satisfactory results.

In accordance with the present invention aldol is reacted with an amine to form an aldol-amine adduct. The aldol can be from any source including the aldol layer which has separated as a result of storage.

The amine utilized to prepare the aldol-amine adduct must be a primary amine which contains a hydroxyl function within three carbon atoms from the amine group. Examples of such amines include, but are not limited to, monoethanolamine ($HOCH_2CH_2NH_2$), 3-amino-1-propanol ($H_2NCH_2CH_2CH_2OH$), 3-amino-1,2,-propanediol ($H_2NCH_2CH(OH)CH_2OH$) and tris(2-hydroxyethyl) methylamine (tris($HOCH_2CH_2)_3CNH_2$). Of these, monoethanolamine is presently preferred.

Amines which do not react with aldol to form an aldol-amine adduct that functions as a sulfide scavenger include secondary amines, hydroxylamine and amines without the hydroxyl group.

The aldol is reacted with the amine, e.g., monoethanolamine, in a molar ratio of aldol to monoethanolamine in the range of from about 1:1 to about 1:0.7 whereby an aldol-monoethanolamine adduct is formed. The resulting adduct is soluble and stable in aqueous acid solutions. Further, the adduct can be stored for very long periods of time without separation.

The aldol-amine adduct can be utilized as a hydrogen sulfide scavenging additive in various aqueous acid solutions containing inorganic acids, organic acids or mixtures of such acids. Examples of inorganic acids with which the additive can be used include hydrochloric acid, hydrofluoric acid and fluoboric acid. Examples of organic acids are formic acid, acetic acid, citric acid, lactic acid, thioglycolic acid and glycolic acid. Generally, the acid solutions utilized for scale removal or stimulating the production of oil and/or gas from subterranean well formations are aqueous acid solutions of predominantly inorganic acids. That is, the aqueous acid solutions contain inorganic acid in an amount in the range of from about 5% to about 30% by weight of the acid solutions.

The aldol-amine adduct is preferably admixed with an aqueous acid solution prior to when the aqueous acid solution dissolves sulfide and metal compounds, e.g., prior to introducing the acid solution into a subterranean well formation to be stimulated or into apparatus to be cleaned. Alternatively, the aldol-amine adduct can be admixed with the aqueous acid solution on the fly as the acid solution is pumped into a well bore or other location.

The amount of the aldol-amine adduct combined with an aqueous acid solution should be that amount which is at least sufficient to prevent precipitation of metal sulfides from the aqueous acid solution during and after the acid spends. In most applications including acid treatments of sour subterranean well formations, the amount of aldol-amine adduct employed is an amount up to about 15% by weight of the aqueous acid solution, preferably an amount in the range of from about 0.1% to about 10% by weight of the aqueous acid solution. Most preferably, the adduct is added to an aqueous acid solution in an amount in the range of from about 0.4% to about 6% by weight of the aqueous acid solution.

The methods and compositions of this invention are particularly useful for performing acid stimulation treatments in sour wells. However, as mentioned, they can also be utilized in a variety of other applications for removing ferrous and non-ferrous metal sulfide scales from metal surfaces of industrial equipment. The aldol-amine adduct functions as a sulfide scavenging additive in an aqueous acid solution used to clean the surfaces in the same way that it functions in an aqueous acid solution used to treat a sour well, i.e., it reacts with sulfide ions in the aqueous acid solution and thereby prevents the sulfide ions from reacting with metal ions therein and subsequently precipitating. Further, as mentioned, the aldol-amine adduct also functions as a metal surface corrosion inhibitor in the aqueous acid solution at temperatures below about 200° F. That is, the presence of the aldol-amine adduct in an aqueous acid solution reduces or prevents corrosion of metal surfaces such as the metal surfaces in pumps, tubular goods and the like.

An aqueous acid composition of the present invention for dissolving metal compounds and sulfide compounds with a minimum of metal surface corrosion and metal sulfide precipitation is comprised of water, an acid selected from the group consisting of inorganic acids, organic acids and mixtures thereof and an aldol-amine adduct present in the composition in an amount sufficient to preferentially react with sulfide ions dissolved in the composition and thereby prevent such sulfide ions from reacting with metal ions dissolved therein and precipitating.

The aqueous acid compositions can be comprised of any of the various inorganic and organic acids mentioned above. However, they are preferably comprised of a major amount of inorganic acid and a minor amount of organic acid, e.g., inorganic acid in an amount in the range of from about 5% to about 30% by weight of the aqueous acid compositions and organic acid in an amount in the range of from about 0% to about 10% by weight of the aqueous acid compositions.

As mentioned above, the sulfide scavenging aldol-amine adduct is preferably present in the aqueous acid compositions in an amount in the range of from about 0.1% to about 10% by weight of the aqueous acid compositions, most preferably in an amount in the range of from about 0.4% to about 6%.

A typical aqueous acid composition of this invention is comprised of water, an inorganic acid, e.g., hydrochloric acid, present in the composition in an amount of about 15% or about 28% by weight of the composition and an aldol-monoethanolamine adduct present in the composition in an amount in the range of from about 0.4% to about 6% by weight of the composition.

Other components can be included in the acid compositions of the present invention including, but not limited to, corrosion inhibitors, pH control additives, fluid loss additives, non-emulsifying agents, oxygen scavengers, mutual solvents and surface active agents. Depending upon the particular application, one or more of these additional components can be used to enhance the degrees of metal surface corrosion inhibition and sulfide precipitation control achieved. Oxygen scavengers can be used to reduce the amount of oxygen present in the aqueous acid composition to inhibit the formation of ferric iron by oxidation of ferrous iron. Compounds such as erythorbic acid and hydroxylamine complexes serve as oxygen scavengers.

In order to further illustrate the methods and compositions of the present invention, the following examples are provided.

EXAMPLE 1

Aldol was treated with varying quantities of monoethanolamine. The quantities of monoethanolamine used were 0.25, 0.50, 0.75 and 1 molar equivalents of monoethanolamine to the aldol. The resulting mixtures were shaken briskly, and after several minutes, the color of the reaction mixtures changed from yellow-green to orange. The test mixtures were aged over a three-day period during which time the colors of the mixtures changed. Within a week the color of the test mixtures stabilized to deep red. The stabilities of the test mixtures were determined over time with the result that the most stable test mixtures were those including 1 and 0.75 molar equivalents of monoethanolamine to aldol. The stability of the test mixture containing 0.5 molar equivalent of MEA was less stable than those containing 1 and 0.75 molar equivalents, and the test mixture containing 0.25 molar equivalents of monoethanolamine was less stable than the sample containing 0.5 molar equivalents.

EXAMPLE 2

A sample of an aqueous solution of aldol which had been stored for three years was obtained. The sample had separated into an upper and lower phase and the upper phase had very little color. Monoethanolamine was added to the aldol in an amount which was equal molar to the aldol. The resulting mixture was shaken for several minutes and as a result the mixture clarified. The resulting 1:1 molar aldol-monoethanolamine adduct was aged for several days and then tested in 15% and 28% hydrochloric acid solutions. The acid solutions containing the adduct were injected onto an excess of iron sulfide (FeS) under 300 psi nitrogen pressure. The acid completely dissolved the iron sulfide within 10 minutes. The pressure was then bled off through solutions of cadmium sulfate which trapped H₂S and showed how much unscavenged H₂S was left in the system by forming cadmium sulfide (CdS). Some CdS was produced because the FeS was present in a molar excess to the adduct. The adduct was stable in both acid solutions for at least 24 hours and obtained excellent sulfide scavenging results which are set forth in Table I below.

TABLE I

Sulfide Scavenging Tests

| 28% HCl @ 275° F. | | 15% HCl @ 275° F. | |
| --- | --- | --- | --- |
| Quantity of 1:1 Molar Aldol-Monoethanolamine Adduct in Acid, % by volume | Cadmium Sulfide Trapped, grams | Quantity of 1:1 Molar Aldol-Monoethanolamine Adduct in Acid, % by volume | Cadmium Sulfide Trapped, grams |
| 0 | 2.6 | 0 | 2.15 |
| 1 | 2.2 | 1 | 1.8 |
| 2 | 1.95 | 2 | 1.55 |
| 3 | 1.7 | 3 | 1.35 |
| 4 | 1.3 | 4 | 1.1 |
| 5 | 0.95 | 5 | 0.75 |

From Table I it can be seen that small quantities of the aldol-monoethanolamine adduct of this invention produced excellent sulfide scavenging results.

EXAMPLE 3

The aldol-monoethanolamine adduct of this invention was added to test samples of 15% hydrochloric acid and 28% hydrochloric acid in various amounts. Corrosion tests were conducted using the test acid samples at various temperatures by immersing N-80 steel coupons in the samples for 4 hours after which the loss of metal from the coupons was determined. The results of these tests are given in Table II below.

TABLE 11

| Test Sample No. | Temperature, ° F. | Aqueous Acid Solution Tested | Quantity of Aldol-Monoethanolamine Adduct Added to Acid, % by volume | Metal Loss, lbs/ft² |
| --- | --- | --- | --- | --- |
| 1 | 175 | 15% HCl | 0 | 0.363 |
| 2 | 175 | 15% HCl | 1[1] | 0.04 |
| 3 | 175 | 15% HCl | 1 | 0.015 |
| 4 | 200 | 15% HCl | 1.5 | 0.023 |
| 5 | 200 | 28% HCl | 2 | 0.026 |

[1]Aldol alone substituted for aldol-monoethanolamine adduct

From Table II it can be seen that the aldol-monoethanolamine adduct of this invention functions as a metal corrosion inhibitor as well as a sulfide scavenger in aqueous acid solutions.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:
1. A method of reducing metal surface corrosion by, and metal sulfide precipitation from, an aqueous acid solution used for acidizing a sour well containing metal compounds and sulfide compounds comprising:
  (a) combining an aldol-amine adduct with said aqueous acid solution to preferentially react with sulfide ions subsequently dissolved by said aqueous acid solution and thereby prevent subsequently dissolved metal ions from reacting therewith and precipitating, said aldol-amine adduct having been prepared by reacting aldol with a primary amine which contains a hydroxyl function within three carbon atoms from the amine group; and
  (b) introducing said aqueous acid solution into said well.
2. The method of claim 1 wherein said aldol-amine adduct is combined with said aqueous acid solution in an amount up to about 15% by weight of said aqueous acid solution.
3. The method of claim 1 wherein the acid in said aqueous acid solution is selected from the group consisting of inorganic acids, organic acids and mixtures thereof.
4. The method of claim 1 wherein said acid in said aqueous acid solution comprises an inorganic acid selected from the group consisting of hydrochloric acid, hydrofluoric acid, fluoboric acid and mixture thereof.
5. The method of claim 4 wherein said inorganic acid is present in said aqueous acid solution in an amount in the range of from about 5% to about 30% by weight of said aqueous acid solution.
6. The method of claim 5 wherein said aqueous acid solution further comprises an organic acid selected from the group consisting of formic acid, acetic acid, citric acid, lactic acid, thioglycolic acid and glycolic acid.
7. The method of claim 6 wherein said organic acid is present in said aqueous acid solution in an amount in the range of from about 0% to about 10% by weight of said aqueous acid solution.
8. A method of reducing metal sulfide precipitation from an aqueous acid solution when the acid solution contains dissolved metal ions and sulfide ions comprising reacting an aldol-monoethanolamine adduct contained in said aqueous acid solution with said dissolved sulfide ions in said solution to thereby prevent said sulfide ions from reacting with said dissolved metal ions and precipitating.
9. The method of claim 8 wherein said aldol-monoethanolamine adduct is present in said aqueous acid solution in an amount in the range of from about 0.1% to about 10% by weight of said aqueous acid solution.
10. The method of claim 8 wherein said acid in said aqueous acid solution comprises an inorganic acid selected from the group consisting of hydrochloric acid, hydrofluoric acid, fluoboric acid and mixture thereof.
11. The method of claim 10 wherein said inorganic acid is present in said aqueous acid solution in an amount in the range of from about 5% to about 30% by weight of said aqueous acid solution.
12. The method of claim 11 wherein said aqueous acid solution further comprises an organic acid selected from the group consisting of formic acid, acetic acid, citric acid, lactic acid, thioglycolic acid and glycolic acid.
13. The method of claim 12 wherein said organic acid is present in said aqueous acid solution in an amount in the range of from about 0% to about 10% by weight of said aqueous acid solution.

* * * * *